Oct. 13, 1964 — A. H. SIEVERS — 3,152,653
DRILL ATTACHMENT FOR VEHICLES
Filed Aug. 30, 1962
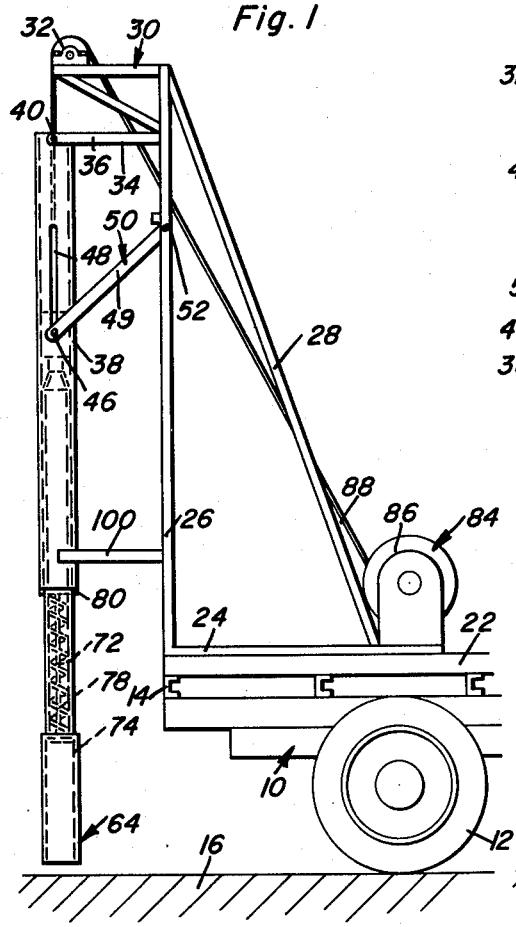
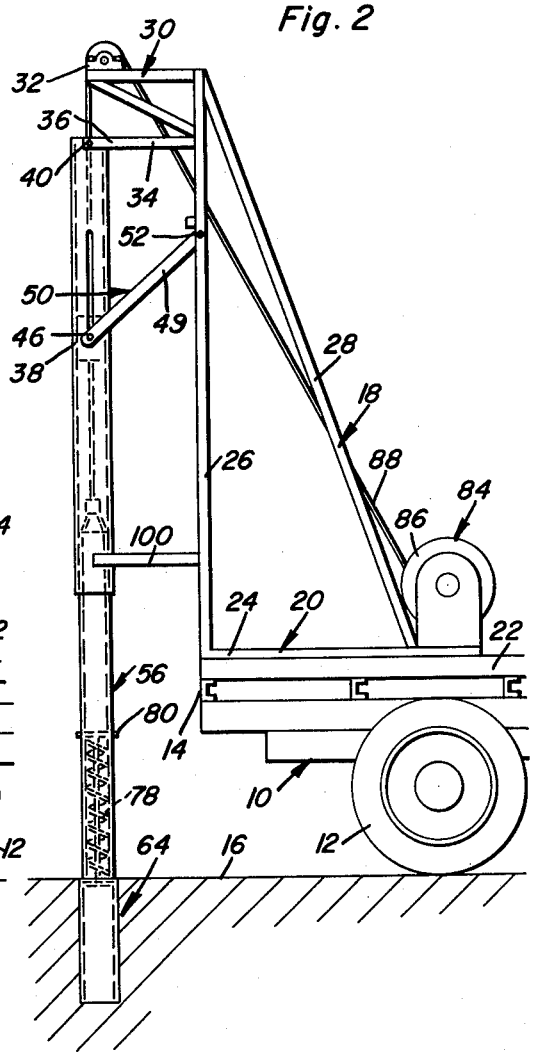
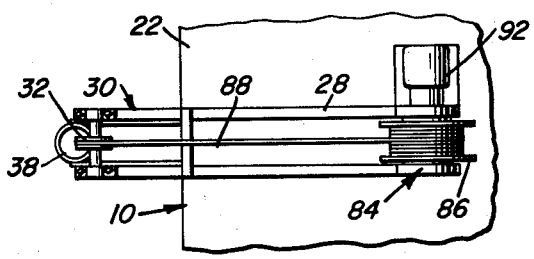
Albert H. Sievers
INVENTOR.

Oct. 13, 1964     A. H. SIEVERS     3,152,653
DRILL ATTACHMENT FOR VEHICLES
Filed Aug. 30, 1962     3 Sheets-Sheet 2
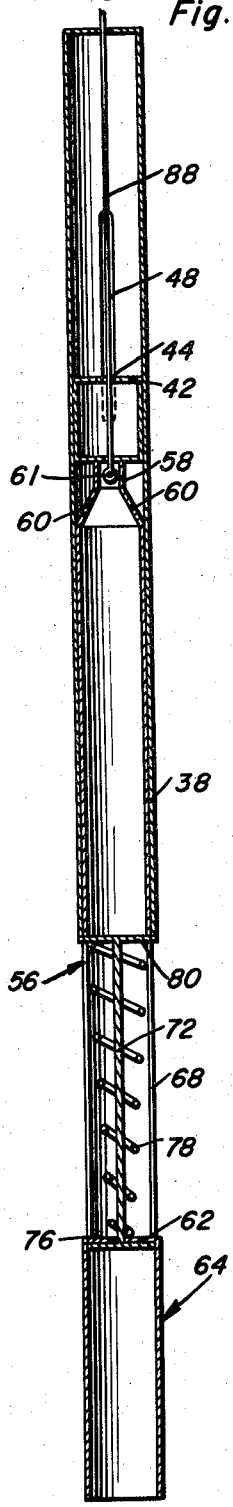
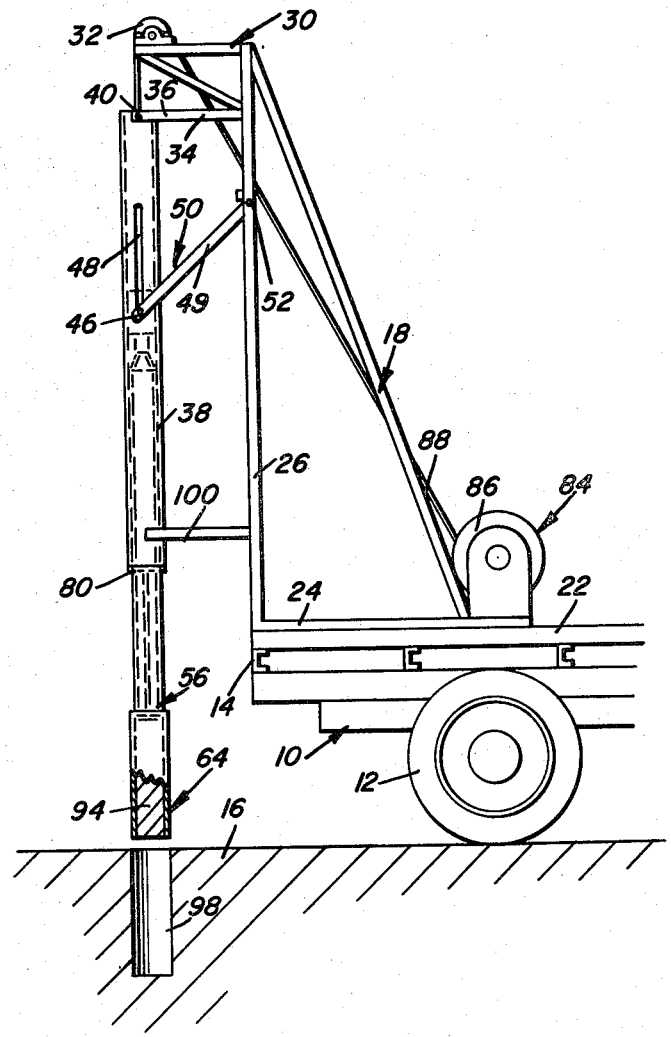
Albert H. Sievers
INVENTOR.

Oct. 13, 1964   A. H. SIEVERS   3,152,653
DRILL ATTACHMENT FOR VEHICLES

Filed Aug. 30, 1962   3 Sheets-Sheet 3

Albert H. Sievers
INVENTOR.

BY *[signatures]*
Attorneys

United States Patent Office 3,152,653
Patented Oct. 13, 1964

3,152,653
DRILL ATTACHMENT FOR VEHICLES
Albert H. Sievers, Fieldon, Ill.
Filed Aug. 30, 1962, Ser. No. 220,380
6 Claims. (Cl. 175—161)

This invention relates to a novel and useful apparatus which may be utilized to form a plurality of holes in the ground in order to assist in the retention of rainwater.

The drill attachment of the instant invention includes a tubular member which may be successively dropped onto the ground along a path generally paralleling its longitudinal axis and raised from engagement with the ground. If a tubular member is forced longitudinally into the ground and then withdrawn from engagement with the ground, a plug of dirt or soil is forced into the lower end of the tubular member as it is pushed into the ground and the plug is withdrawn from the ground along with the tubular member as the latter is raised. The drill attachment is also provided with means whereby the tubular member will automatically be laterally offset to one side of the hole previously dug thereby as the tubular member is raised beyond a predetermined point above the ground. In addition, means is provided whereby the plug within the tubular member will be automatically ejected from the lower end thereof as the tubular member is raised above a predetermined point after having been withdrawn from engagement with the ground. In this manner, successive operations may be performed to form a plurality of shallow holes in the ground in order that a larger amount of rainwater may be retained.

If the surface of an area of ground has a plurality of holes formed therein, during a rainstorm the area of the ground about the openings will absorb the usual amount of moisture while the holes formed in the ground may collect and retain a volume of water equal to the volume of the hole. In this manner, after the rainstorm has passed, the collected water in the holes formed in the ground may slowly be absorbed by the latter. If the ground surface does not have a plurality of holes formed therein, any amount of rain which falls in excess of the amount that can be absorbed by the ground in a predetermined amount of time runs over the surface of the ground to the lowest point thereof. Accordingly, in some areas much water is lost and is not retained by the ground on which rain falls due to excessive run off.

The main object of this invention is to provide a drill attachment that may be readily mounted upon any suitable type of vehicle such as a truck or tractor and be utilized to form a plurality of holes in the ground.

A further object of this invention, in accordance with the immediately preceding object, is to provide a drill attachment for forming a plurality of shallow holes in the ground and which is constructed in a manner whereby it may be readily powered by conventional inexpensive power sources.

Still another object of this invention is to provide a drill attachment which will be readily adapted to be used in groups of two or more whereby a plurality of holes may be simultaneously formed thereby.

A final object to be specifically enumerated herein is to provide a drill attachment in accordance with the preceding objects which will conform to conventional forms of manufacture, be of simple construction and easy to operate so as to provide a device that will be economically feasible, long lasting and trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1 through 4 are similar side elevational views of the drill attachment shown mounted on the rear end of a truck and with the components of the drill attachment shown in consecutive stages of operation;

FIGURE 5 is an enlarged longitudinal vertical sectional view of the guide and drop member of the drill attachment taken substantially upon a plane passing through the longitudinal center line of the guide;

FIGURE 7 is a fragmentary top plan view of the embodiment illustrated in FIGURE 1.

Figure 6:
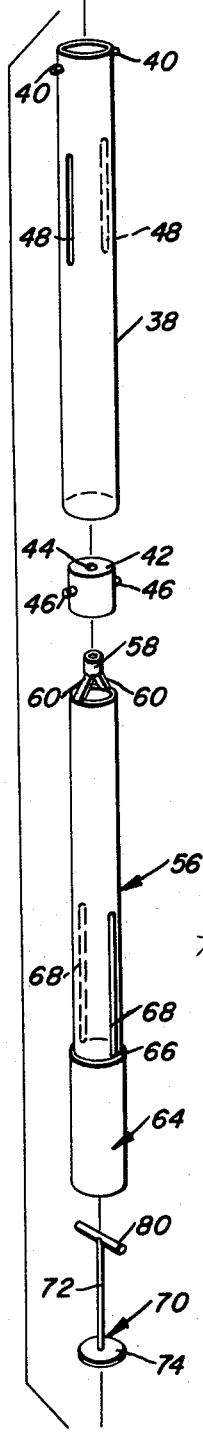
FIGURE 6 is an exploded perspective view of the guide and drop member of the drill attachment.

Referring now more specifically to the drawings the numeral 10 generally designates a vehicle which is provided with ground engaging support wheels 12 for supporting the frame 14 of the vehicle above the ground 16.

The drill attachment of the instant invention is generally referred to by the reference numeral 18 and comprises a support frame generally referred to by the reference numeral 20 which may be secured to the flooring 22 of the truck frame 14 in any convenient manner. The support frame 20 includes a horizontal portion 24 and an upstanding portion 26. A diagonal brace assembly 28 is secured between the remote ends of the horizontal and upstanding portions 24 and 26 in any convenient manner. A head assembly or support platform generally referred to by the reference numeral 30 is carried by the upper end of the upright portion 26 and includes a pulley assembly 32. In addition, it will be noted that the support platform 30 also includes a horizontally disposed support member 34 which comprises a pair of arm members 36 that are secured at adjacent ends to the upright portion 26 in any convenient manner.

An upstanding elongated tubular guide 38 is provided with a pair of outwardly and oppositely projecting stub axles 40 at its upper end which pivotally secure the upper end of the tubular guide 38 between the ends of the arms or arm members 36 remote from the upright portion 26. A cylindrical abutment member 42 having a small diameter bore 44 formed longitudinally therethrough is slidably disposed in the upper portion of the tubular guide 38 and includes a pair of outwardly and oppositely directed stub axles 46 which are slidably received in a pair of diametrically opposite and longitudinally extending slots 48 formed in the upper end of the tubular guide 38. A pair of lever arms 49 defining a lever arm assembly generally referred to by the reference numeral 50 are pivotally secured at one pair of corresponding ends to the upright portion 26 by means of pivot pins 52 and the other pair of corresponding end portions of the lever arms 49 are pivotally secured to the free ends of the stub axles 46 which project outwardly of the slots 48.

A tubular drop member generally referred to by the reference numeral 56 has its uppermost end telescopingly engaged within the lower end of the tubular guide 38 and has a small diameter sleeve guide member 58 supported concentrically with the longitudinal axis of the drop member 56 on the upper end thereof by means of a pair of braces 60.

The lower end of the tubular drop member 56 is closed by the upper end wall 62 of a tubular digging member generally referred to by the reference numeral 64 which is secured across the lower end of the tubular drop member 56. It will be noted that the tubular digging member 64 has a larger outside diameter than the tubular drop member 56 and that the outer peripheral portions of the top wall 62 of the tubular digging member 64 define an annular shoulder 66 on the lower end of the tubular drop member 56. A pair of diametrically opposite and longitudinally extending slots 68 are formed in the tubular drop member 56 and extend from the annular shoulder 66 upwardly to approximately a point spaced equally from the opposite ends of the tubular drop member 56.

A plunger member generally referred to by the reference numeral 70 is provided and comprises a shank portion 72 on whose lower end a piston 74 is secured. The piston 74 is reciprocable in the tubular digging member 64 and the shank member or portion 72 extends upwardly through the bore 76 formed in the top wall 62. A compression spring 78 is disposed about the shank portion 72 intermediate the top wall 62 and the crosshead 80 carried by the upper portion of the shank portion 72. The opposite ends of the crosshead 80 are slidingly received in the slots 68.

Figure 4:
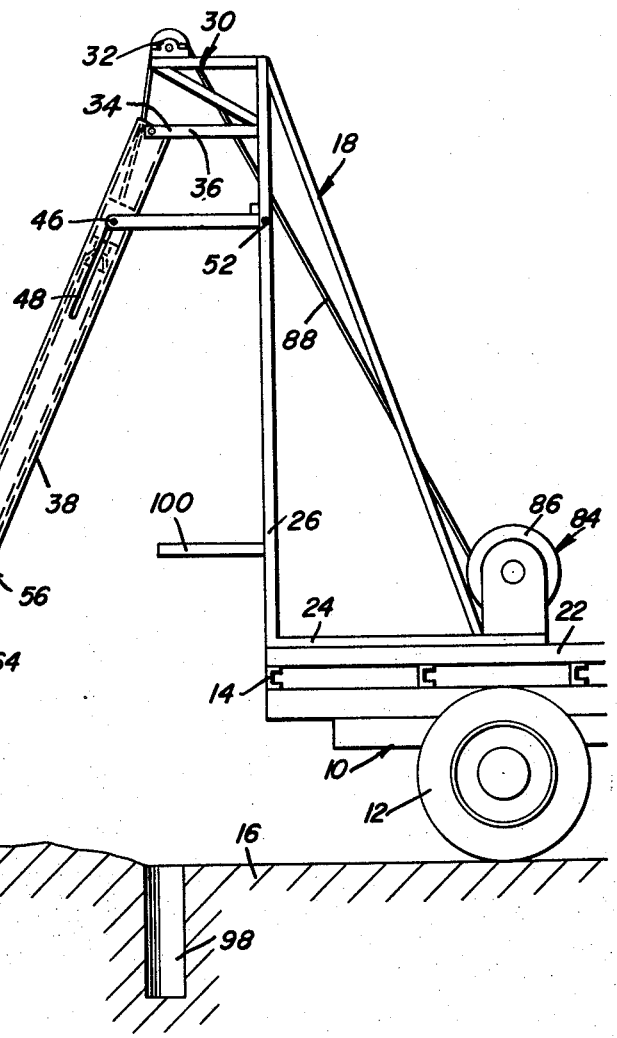

As can best be seen from FIGURES 1 through 5 of the drawings the drill attachment includes a winch assembly generally referred to by the reference numeral 84 that is provided with a winding drum 86 about which one end of an elongated flexible pull member 88 is wound. The other end of the flexible pull member 88 is entrained over the pulley assembly 32 and passed downwardly into the upper end of the tubular guide 36, through the bore 44 and is secured to the sleeve guide member 58 by means of a cross pin 61 secured through the sleeve guide member 58.

The winch assembly 84 includes a reversible motor 92 for rotating the winding drum 86 and it may therefore be seen that the tubular drop member 56 may be raised and lowered relative to the ground 16 by which the vehicle 10 is supported. In operation, and with reference in particular to FIGURES 1 through 4 of the drawings, the vehicle 10 may be positioned such that the lower end of the tubular digging member 64 is disposed immediately above the point at which it is desired to dig a hole in the ground 16. Then, the motor 92 may be operated to rapidly drop the drop member 56 by unreeling a portion of the pull member 88 wound about the winding drum 86 whereupon the momentum of the tubular drop member 56 will urge the tubular digging member into the ground 16 as viewed in FIGURE 2 of the drawings. Then, the winch assembly 84 may be again actuated to wind the drum 86 in the opposite direction whereupon the pull member 88 will withdraw the tubular digging member 64 from the ground 16 as viewed in FIGURE 3 of the drawings. Inasmuch as a plug 94 of the ground was forced up into the tubular digging member 64 upon its being forced into the ground 16, the plug 94 is also withdrawn from the ground 16 along with the tubular digging member 64. As the winch assembly 84 continues to operate and to raise the tubular drop member 56 above the position illustrated in FIGURE 3 of the drawings, the abutment member 42 will be engaged by the sleeve guide member 58 whereupon the ends of the arms 49 remote from the upright portion 26 will be swung upwardly during which movement the lower end of the tubular guide 38 will be swung outwardly and to the rear of the vehicle 10. At the same time the tubular guide 38 has its lower end swung rearwardly away from the vehicle 10, the crosshead 80 will engage the lower end of the tubular guide 38 whereupon it will be moved downwardly through the slots 68 thereby effecting movement of the piston 74 downwardly in the tubular digging member 64 to eject the plug 94 downwardly and outwardly of the lower end of the tubular digging member 64. Thus, as the tubular digging member 56 is raised, as soon as its lower end clears the ground 16, its lower end is swung to the rear of the vehicle 10 so as to be displaced laterally of the hole 98 formed by the removal of the plug 94 and the plug 94 is ejected downwardly and outwardly of the lower end of the tubular digging member 64. Then, the winch assembly 84 may be operated to unreel a portion of the pull member 88 whereupon the tubular digging member 56 will again be lowered enabling the tubular guide 38 to resume its normal perpendicular position with the lower end thereof abutted against the abutment arm 100 carried by the lower end of the upright portion 26. Then, the vehicle 10 may be moved to the next location for digging the next hole. If it is desired, the holes 98 may be filled with gravel to prevent them from filling with soil over a period of time. Also, the holes may be of a depth to extend downwardly into more porous strata whereby relatively large amounts of water may be absorbed by the ground and water run-off may be substantially eliminated.

It is to be understood that while the drill attachment of the instant invention has been shown as including only one tubular guide 38 and one tubular digging member 56, a plurality of tubular guides and tubular digging members 56 may be operated by the same winch assembly 84.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drill attachment for vehicles comprising a support frame, a guide pivotally mounted on said support frame for rotation about a generally horizontally disposed axis, an elongated upright drop member supported from said guide for longitudinal reciprocation, the lower end of said drop member including means defining a downwardly opening recess, movable plunger means disposed in said recess for ejecting dirt plugs forced thereinto from the lower end thereof, means for raising and lowering said drop member relative to said guide, coacting means carried by said guide and support frame and actuated by said drop member for pivoting said guide about its axis of rotation in response to the raising of said drop member above a predetermined point relative to said guide, said guide comprising an upstanding tube member in at least the lower end portion of which said drop member is telescopingly received, said coacting means including arm means pivotally secured to said frame at one end for rotation about an axis generally paralleling the axis of rotation of said guide and pivotally and slidably secured to said guide at the other end for movement about an axis generally paralleling the axis of rotation of said guide and limited movement longitudinally along said guide and abutment means carried by said other end of said arm means and engageable by said drop member for raising said other end of said arm means in response to raising of said drop member above said predetermined point.

2. The combination of claim 1 including abutment means carried by said frame engageable with said guide for preventing pivotal movement of said guide in one direction past a position with said drop member substantially vertically disposed.

3. The combination of claim 1 wherein said means defining a recess comprises a tubular member carried by the lower end of said drop member whose longitudinal axis substantially parallels the longitudinal axis of said drop member.

4. The combination of claim 1 wherein said means for raising and lowering said drop member comprises a winch assembly supported from said frame and including a winding drum about which one end of a flexible pull member is wound, the other end of said pull member being secured to the top of said drop member.

5. A drill assembly comprising a support frame, elongated upstanding guide means, means pivotally supporting the upper end of said guide means from said support frame for rotation about a generally horizontally disposed axis, a drop member supported from said guide means for reciprocation therealong, the lower end portion of said drop member defining a downwardly opening recess, means for raising and lowering said drop member relative to said guide means, coacting means carried by said guide means and support frame and actuated by said drop member for pivoting said guide means about its axis of rotation relative to said support frame in response to the raising of said drop member above a predetermined point, said coacting means including arm means pivotally secured to said support frame at one end for rotation about an axis generally paralleling the axis of rotation of said guide means and pivotally and slidably secured to said guide means at the other end for movement about an axis generally paralleling the axis of rotation of said guide means relative to said support frame and limited movement longitudinally along said guide means, and abutment means carried by said other end of said arm means and engageable by said drop member for raising said other end of said arm means in response to raising of said drop member above a predetermined point.

6. The combination of claim 5 including movable plunger means disposed in said recess for ejecting dirt plugs forced thereinto from the lower end thereof, and means carried by said drop member and engageable with said guide means for urging said plunger means downwardly relative to said drop member to eject a dirt plug therein in response to the raising of said drop member above a predetermined point relative to said guide means.

References Cited in the file of this patent

UNITED STATES PATENTS

| | | |
|---|---|---|
| 938,970 | Carlson | Nov. 2, 1909 |
| 2,154,732 | Dahl | Apr. 18, 1939 |
| 2,643,096 | Bates | June 23, 1953 |
| 2,768,570 | Strid | Oct. 30, 1956 |
| 2,825,535 | Thornburg et al. | Mar. 4, 1958 |

FOREIGN PATENTS

| | | |
|---|---|---|
| 773,387 | Great Britain | Apr. 24, 1957 |
| 815,251 | Great Britain | June 24, 1959 |